US012319112B1

(12) United States Patent
Marble et al.

(10) Patent No.: US 12,319,112 B1
(45) Date of Patent: Jun. 3, 2025

(54) TELESCOPING MULTI-SECTION LOCKABLE LINK FOR A VEHICLE SUSPENSION STABILIZER BAR

(71) Applicant: GM GLOBAL TECHNOLOGY OPERATIONS LLC, Detroit, MI (US)

(72) Inventors: Robert P. Marble, White Lake, MI (US); Brian K. Saylor, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/647,231

(22) Filed: Apr. 26, 2024

(51) Int. Cl.
*B60G 21/10* (2006.01)
*B60G 17/015* (2006.01)

(52) U.S. Cl.
CPC ....... *B60G 21/106* (2013.01); *B60G 17/0152* (2013.01); *B60G 2204/82* (2013.01); *B60G 2204/8304* (2013.01); *B60G 2800/0122* (2013.01)

(58) Field of Classification Search
CPC .............. B60G 21/106; B60G 17/0152; B60G 2204/82; B60G 2204/8304; B60G 2800/0122
See application file for complete search history.

(56) References Cited

U.S. PATENT DOCUMENTS

| 5,630,623 | A | * | 5/1997 | Ganzel | B60G 17/016 |
| | | | | | 280/124.157 |
| 5,987,366 | A | * | 11/1999 | Jun | B60G 17/0195 |
| | | | | | 701/1 |
| 6,116,140 | A | * | 9/2000 | Barthalow | F15B 15/16 |
| | | | | | 91/530 |
| 7,637,513 | B2 | * | 12/2009 | Kotulla | B60G 11/44 |
| | | | | | 280/124.157 |
| 8,936,250 | B2 | * | 1/2015 | Henriksson | B62D 9/00 |
| | | | | | 280/6.157 |
| 2005/0253350 | A1 | * | 11/2005 | Suchta | B60G 21/106 |
| | | | | | 280/124.106 |
| 2022/0016949 | A1 | * | 1/2022 | Graus | B60G 17/08 |

FOREIGN PATENT DOCUMENTS

CN 108674120 A * 10/2018 ........... B60G 21/055

OTHER PUBLICATIONS

CN108674120A Machine English translation (Year: 2018).*

* cited by examiner

*Primary Examiner* — Jason D Shanske
*Assistant Examiner* — Matthew James O'Neill
(74) *Attorney, Agent, or Firm* — Quinn IP Law (57) ABSTRACT

A vehicle includes a vehicle body arranged along a first axis and first and second road wheels, each mounted on a second axis perpendicular to the first axis. The vehicle also includes a stabilizer bar mounted to the vehicle body. The vehicle additionally includes respective first and second telescoping multiple-section links connecting the stabilizer bar to corresponding first and second road wheels. Each of the first and the second telescoping multiple-section links is configured to selectively operate in a first mode and a second mode. In the first mode, telescoping of each of the first and the second multiple-section links is locked to operatively connect the first road wheel to the second road wheel via the stabilizer bar. In the second mode, the telescoping of each of the first and the second multiple-section links is unlocked to operatively disconnect the first and second road wheels from the stabilizer bar.

20 Claims, 4 Drawing Sheets

TELESCOPING MULTI-SECTION LOCKABLE LINK FOR A VEHICLE SUSPENSION STABILIZER BAR

TECHNICAL FIELD

The present disclosure relates to a telescoping multiple-section lockable link for a vehicle suspension stabilizer bar.

BACKGROUND

Contemporary on- and off-road vehicles typically employ suspension systems that generally include a system of springs, shock absorbers, and linkages that connect a vehicle body to the vehicle's wheels. Because most forces acting on the vehicle body are transmitted through contact patches between the road and the tires, one of the main objectives of a vehicle suspension is to maintain the contact between the vehicle's road wheels and the road surface.

Vehicle suspension systems generally contribute to the vehicle's roadholding/handling and braking, as well as provide comfort and reasonable isolation from road noise, bumps, and vibrations to the vehicle occupants. On-road vehicles commonly employ stabilizer or sway bars to reduce roll of the vehicle body in curves, sharp corners, or over large bumps. In comparison to on-road focused vehicles, dedicated off-road vehicles generally require greater wheel/suspension articulation for traversing uneven terrain.

Because these objectives generally conflict, the tuning of suspensions involves finding a compromise that is appropriate to the vehicle's intended purpose. For example, a suspension for a sporting vehicle may be tuned to give up some ride comfort in return for enhanced operator control, while a suspension for a luxury vehicle may be tuned for the opposite outcome. However, tuning of a suspension for both on- and off-road use frequently results in significantly compromised performance in either application.

SUMMARY

A vehicle includes a vehicle body arranged along a first axis and first and second road wheels, each mounted on a second axis perpendicular to the first axis and configured to maintain contact with a road surface. The vehicle also includes a stabilizer bar mounted to the vehicle body and configured to generate a predetermined vehicle roll-stiffness. The vehicle additionally includes a first telescoping multiple-section link connecting the stabilizer bar to the first road wheel and a second telescoping multiple-section link connecting the stabilizer bar to the second road wheel. Each of the first and the second telescoping multiple-section links is configured to selectively operate in a first mode and a second mode. In the first mode, telescoping of each of the first and the second multiple-section links is locked to operatively connect the first road wheel to the second road wheel via the stabilizer bar. In the second mode, the telescoping of each of the first and the second multiple-section links is unlocked to operatively disconnect the first road wheel and the second road wheel from the stabilizer bar.

Each of the first and the second telescoping multiple-section links may include a first, a second, and a third section. The first section may be configured to selectively extend into and retract from the second section and the second section may be configured to selectively extend into and retract from the third section.

The vehicle may also include a first reservoir and a second reservoir. The first and second reservoirs may be configured to supply a fluid to the respective first and second telescoping multiple-section links to vary a length thereof.

Each of the first and the second telescoping multiple-section links may include a sensor configured to detect the length of the corresponding link.

Each of the first and second reservoirs may be configured to supply the fluid to the third section of the corresponding telescoping multiple-section link.

The respective first and second reservoirs may be mounted to the third section of the corresponding first and second telescoping multiple-section links.

Alternatively, the respective first and second reservoirs may be arranged remotely from the corresponding first and second telescoping multiple-section links.

The fluid used to vary the length of the telescoping multiple-section links may be a hydraulic fluid.

Each of the first and the second telescoping multiple-section links may include a valve configured to regulate transfer of the hydraulic fluid between the respective reservoir and the corresponding third section.

The fluid used to vary the length of the telescoping multiple-section links may be a magneto-rheological fluid.

The third section may include a magnet array configured to energize the magneto-rheological fluid.

The vehicle may additionally include an electronic controller programmed to select between the first mode and the second mode of operation of the first and the second telescoping multiple-section links.

A system for controlling suspension articulation in a vehicle and having telescoping multiple-section links operated via an electronic controller is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front", "back", "fore", "aft", "left", "right", "rear", "side", "upward", "downward", "top", and "bottom", etc., describe the orientation and/or location of portions of the components or elements within a consistent but arbitrary frame of reference, which is made clear by reference to the text and the associated drawings describing the components or elements under discussion.

Furthermore, terms such as "first", "second", "third", and so on may be used to describe separate components. Such terminology may include the words specifically mentioned above, derivatives thereof, and words of similar import, and are used descriptively for the figures, and do not represent limitations on the scope of the disclosure, as defined by the appended claims. Moreover, the teachings may be described herein in terms of functional and/or logical block components and/or various processing steps. It should be realized that such block components may include a number of hardware, software, and/or firmware components configured to perform the specified functions.

Figure 1:
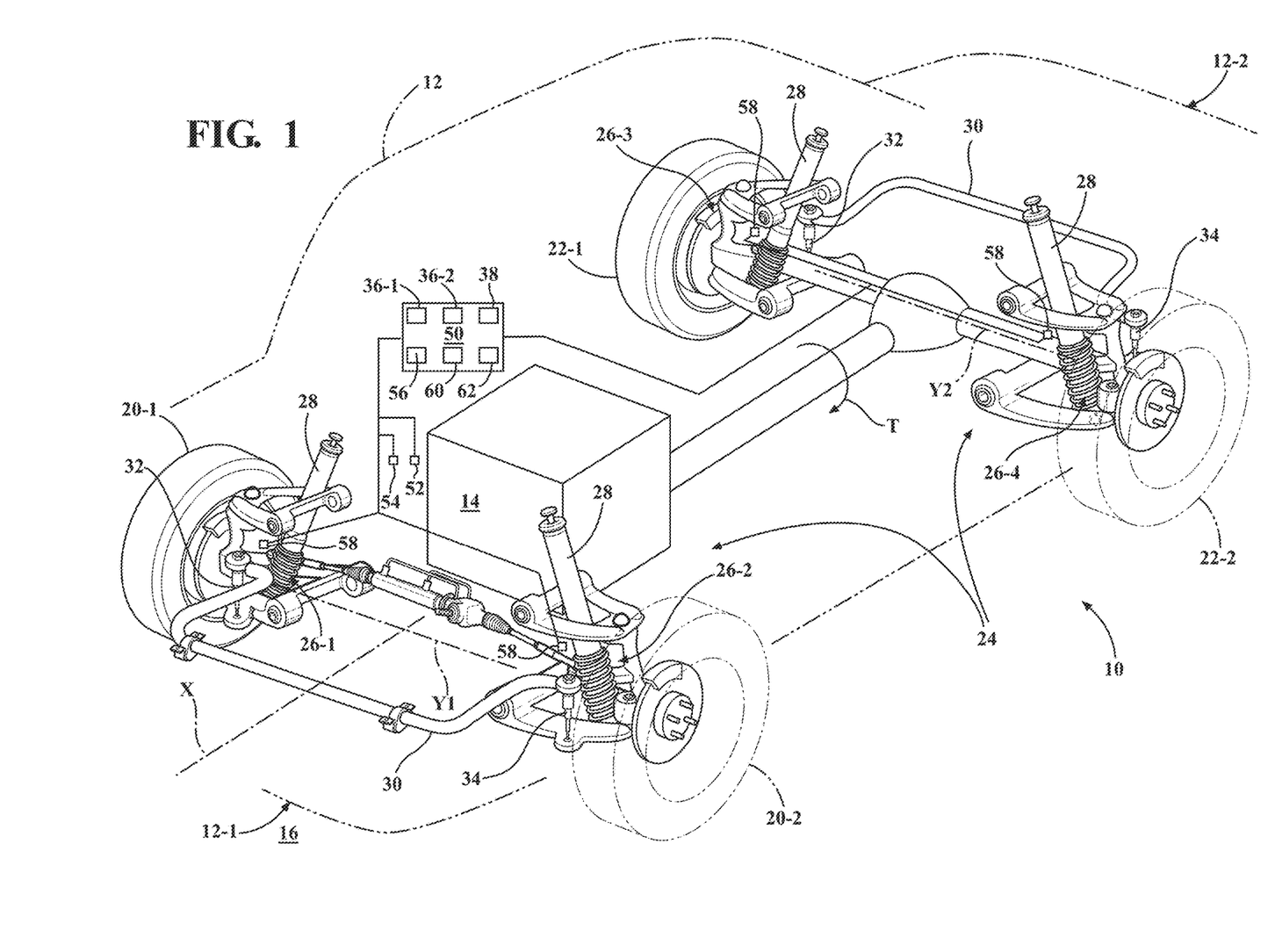
FIG. 1 is a schematic perspective view of a motor vehicle having a suspension system with front and rear stabilizer bars connected to the vehicle road wheels via individual telescoping multiple-section links, according to the disclosure.

Referring to the drawings, wherein like reference numbers refer to like components, FIG. 1 shows a schematic view of a motor vehicle 10, which includes a vehicle body 12. As shown, the vehicle body 12 having a front end 12-1 and a rear end 12-2 is arranged along a centerline or first axis X. The vehicle 10 also includes a powerplant 14 configured to generate a drive torque T for propelling the vehicle 10 over a road surface 16. The powerplant 14 may include an internal combustion engine, one or more electric motor/generators, and/or a fuel cell, neither of which are specifically shown, but a powerplant including such devices would be appreciated by those skilled in the art.

The vehicle 10 also includes a plurality of road wheels that includes a pair of front wheels first and second wheels 20-1 and 20-2 and a pair of rear first and second wheels 22-1 and 22-2. As shown, each pair of first and second road wheels is mounted on an individual second axis, Y1 at the front of the vehicle 10 and Y2 at the rear, that is perpendicular to the first axis X. Although a total of four wheels, i.e., a pair of front wheels (right-front 20-1, left-front 20-2) and a pair of rear wheels (right-rear 22-1, left-rear 22-2) are shown in FIG. 1, a vehicle with fewer or greater number of wheels is also envisioned. The powerplant 14 may be operatively connected to drive wheels 20-1, 20-2 and/or a 22-1, 22-2 via a single, multi-speed, or variable-speed transmission (not shown).

Figure 2:
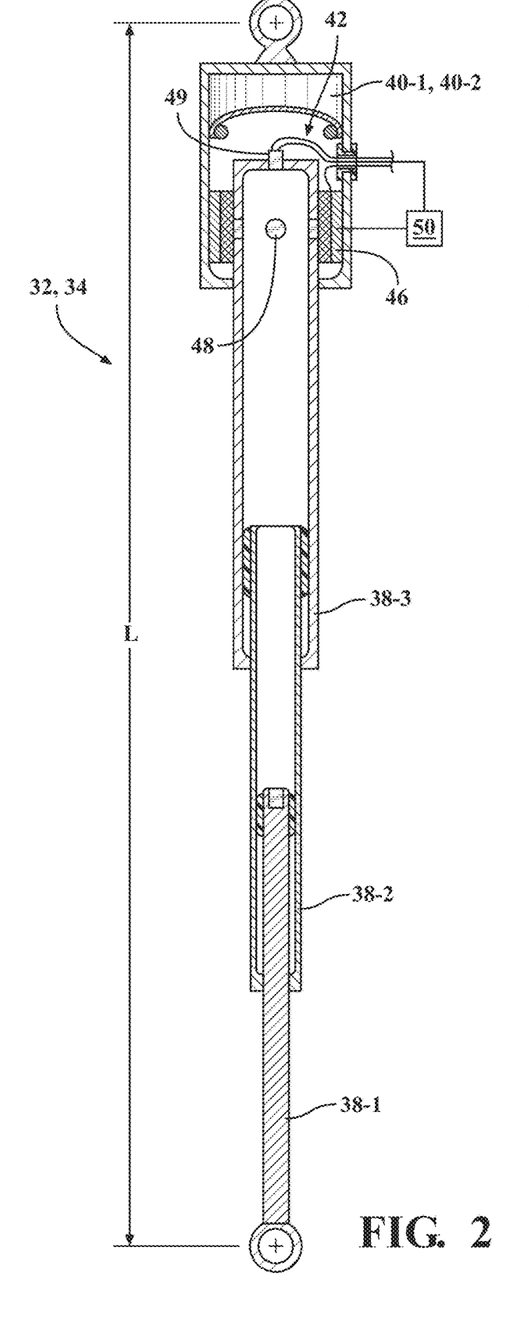
FIG. 2 is a schematic close-up cross-sectional side view of one embodiment of the telescoping multiple-section link shown in FIG. 1, the subject link being illustrated in a fully extended state, according to the disclosure.
Figure 3:
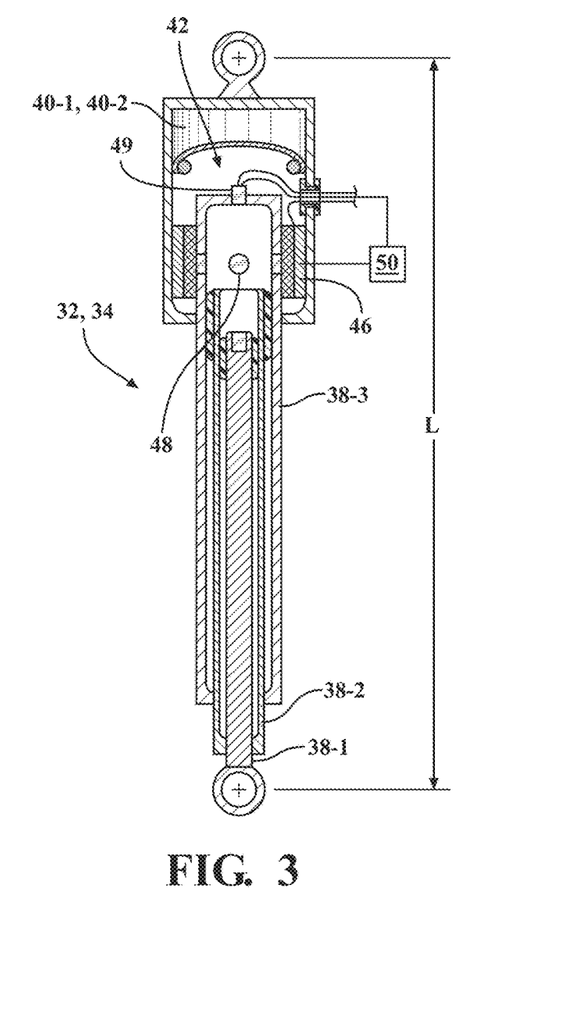
FIG. 3 is a schematic close-up cross-sectional side view of the telescoping multiple-section link shown in FIG. 2, the subject link being illustrated in a fully contracted state, according to the disclosure.

As shown, a vehicle suspension system 24 operatively connects the body 12 to the respective front and rear wheels for maintaining contact between the wheels and a road surface 16, and for maintaining handling of the vehicle. As shown in FIGS. 1-3, the suspension system 24 includes individual left and right suspension subsystems or corners at each of the front wheels 20-1, 20-2 and each of the rear wheels 22-1, 22-2, shown as a right-front suspension corner 26-1, left-front suspension corner 26-2, right-rear suspension corner 26-3, left-rear suspension corner 26-4. Each suspension corner 26-1 through 26-4 may include a shock absorber or damper 28 arranged operatively between the vehicle body 12 and the particular road wheel 20-1, 20-2, 22-1, 22-2 and other components, such as pivotable control arms, etc.

The vehicle suspension system 24 also includes at least one stabilizer or sway bar 30 mounted to the vehicle body 12 along the second axis (Y1 or Y2). As shown, one stabilizer bar 30 may be arranged along the transverse axis Y1 at the front 12-1 of the vehicle, between the right-front and left-front road wheels 20-1, 20-2. Another stabilizer bar 30 may be arranged along the transverse axis Y2 at the rear 12-2 of the vehicle, mounted between the right-rear and left-rear road wheels 22-1, 22-2. Typically, rigid links connect suspension components at the left and right road wheels via a stabilizer bar and help force opposing sides of a vehicle to lower or rise to similar heights. A stabilizer bar is intended to keep the vehicle's body flat by moving force from one side of the vehicle body to the opposite side. As a result, a stabilizer bar reduces vehicle body roll on curves, sharp corners, or over large bumps and helps maintain vehicle stability.

The vehicle suspension system 24 additionally includes at least one pair of telescoping multiple-section (variable length) links-a first link 32 and a second link 34. Each pair of first and second telescoping multiple-section links 32, 34 is configured to connect the respective stabilizer bar 30 to the corresponding first and second road wheels via suspension components, such as A-arms (not shown). The first telescoping multiple-section link 32 is configured to connect the stabilizer bar 30 to the first road wheel, for example to the right-front wheel 20-1 or to right-rear wheel 22-1. The second telescoping multiple-section link 34 is configured to connect the stabilizer bar 30 to the second road wheel, for example to the left-front wheel 20-2 or to left-rear 22-2 wheel. As a result, in response to vehicle maneuvers and/or road conditions, the first telescoping multiple-section link 32 and the second telescoping multiple-section link 34 control the transfer of forces between road wheels 20-1, 20-2 and between road wheels 22-1, 22-2 via the respective stabilizer bars 30.

Each of the first and the second telescoping multiple-section links 32, 34 is configured to selectively operate in a first mode 36-1 and a second mode 36-2, which control the subject link's length L. In the first mode 36-1, the telescoping action of each of the first and the second multiple-section links 32, 34 is locked in a predetermined length 38 of the respective links, which may be between a fully extended and a fully contracted length. In the predetermined locked length 38, the first and the second telescoping multiple-section links 32, 34 operatively connect the first road wheel to the respective second road wheel (e.g., 20-1 to 20-2 or 22-1 to 22-2) via the respective stabilizer bar 30. The first mode 36-1 of the first and the second multiple-section links 32, 34 is thereby intended to load the stabilizer bar 30 and provide corresponding vehicle roll-stiffness for negotiating curves along the road surface 16.

In the second mode 36-2, the telescoping action of the first and the second multiple-section links 32, 34 is unlocked, permitting each of the links to freely vary its length. The unlocked state of the first and the second multiple-section links 32, 34 enables the first road wheel and the respective second road wheel to be operatively disconnected from the stabilizer bar 30 and from each other. The second mode 36-2 of the first and the second multiple-section links 32, 34 is thereby intended to negate the predetermined vehicle roll-stiffness achieved in the first mode 36-1. The second mode 36-2 may be advantageous in facilitating effective negotiation of off-road terrain by vehicle 10, where increased road wheel articulation is needed to maintain wheel contact with an uneven road surface.

As shown in FIGS. 2-5, each of the first and the second telescoping multiple-section links 32, 34 may include a first 38-1, a second 38-1, and a third section 38-1. The first section 38-1 is configured to selectively extend into and retract from the second section 38-2 and the second section 38-2 is configured to selectively extend into and retract from the third section 38-3. Accordingly, the first and the second telescoping multiple-section links 32, 34 may operate in a fully extended length or state (shown in FIGS. 2 and 4), a fully retracted length (shown in FIGS. 3 and 5), and an intermediate length. The vehicle suspension system 24 may additionally include a first reservoir 40-1 and a second reservoir 40-2.

The first and second reservoirs 40-1, 40-2 are configured to supply a fluid 42 to the respective first and second telescoping multiple-section links 32, 34 to vary the length thereof. In other words, the fluid 42 supplied by the first and second reservoirs 40-1, 40-2 to the corresponding multiple-section links 32, 34 forces the first section 38-1 of the subject link to extend from the second section 38-2 and the second section 38-2 to extend from the third section 38-3 via telescoping action thereof. Fluid 42 may be a hydraulic or a magneto-rheological (MR) fluid. Generally, an MR fluid is a type of smart fluid in a carrier fluid, usually a type of oil. When subjected to a magnetic field, the fluid greatly increases its apparent viscosity, to the point of becoming a viscoelastic solid.

Each of the first and second reservoirs 40-1, 40-2 may be configured to supply the fluid 42 to the third section 38-3 of the corresponding telescoping multiple-section link 32, 34. In the embodiment using an MR fluid 42 (shown in FIGS. 2 and 3), the third section 38-3 may include a magnet array 46, for example using permanent magnets (PM), configured to energize the MR fluid 42 and an orifice 48 configured to permit the MR fluid to pass through and extend the corresponding first or second telescoping multiple-section link 32, 34. In the embodiment using a hydraulic fluid 42, each of the first and the second telescoping multiple-section links may include a servo-operated valve 45 (shown in FIGS. 4 and 5) configured to regulate the transfer of the hydraulic fluid between the respective reservoir 40-1, 40-2 and the corresponding third section 38-3.

In one alternative of the embodiment shown in FIGS. 2 and 3, in the first (locked) mode 36-1 of the first and second telescoping multiple-section links 32, 34, an electric current applied to the magnet array 46 counters the magnetic flux of the PMs, which reduces the shear strength of the MR fluid and permits the MR fluid to pass through the orifice 48. In the same alternative, in the second (unlocked) mode 36-2 of the first and second telescoping multiple-section links 32, 34, when the electric current is shut off, the shear strength of the MR fluid returns to its base heightened state and obstructs the MR fluid from passing through the orifice 48.

In another alternative of the embodiment shown in FIGS. 2 and 3, in the first (locked) mode 36-1 of the first and second telescoping multiple-section links 32, 34, when the electric current to the magnet array 46 is shut off, the MR fluid exhibits a baseline shear strength that permits the MR fluid to pass through the orifice 48. In the same alternative, in the second (unlocked) mode 36-2 of the first and second telescoping multiple-section links 32, 34, when the electric current is applied to the magnet array 46, the current counters the magnetic flux of the PMs to increase the shear strength of the MR fluid, which obstructs the MR fluid from passing through the orifice 48.

Figure 4:
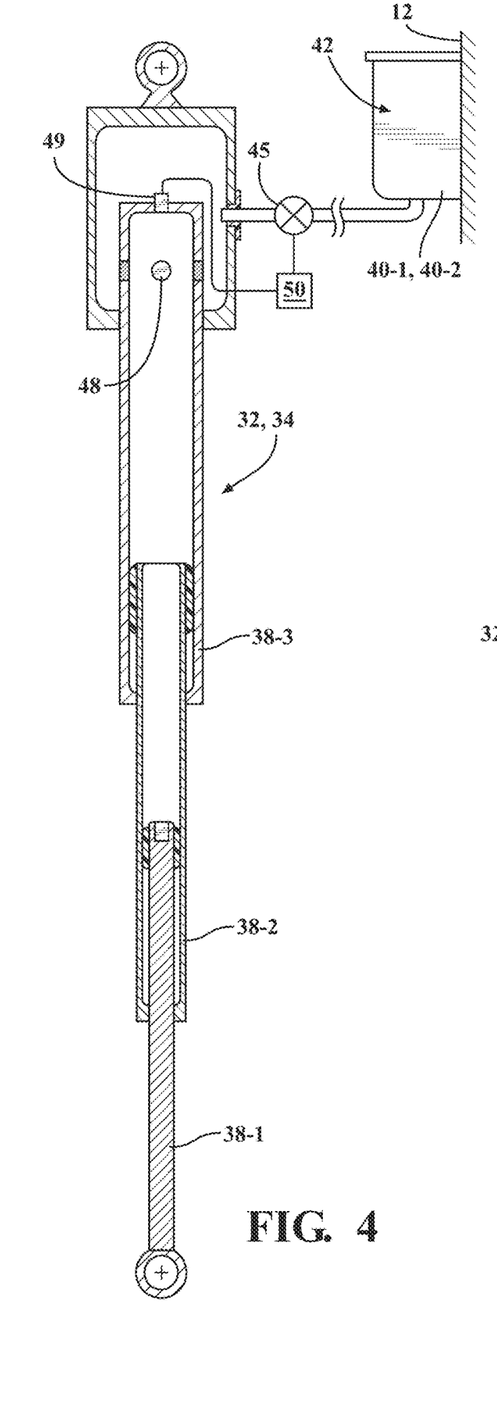
FIG. 4 is a schematic close-up cross-sectional side of another embodiment of the telescoping multiple-section link shown in FIG. 1, the subject link being illustrated in a fully extended state, according to the disclosure.
Figure 5:
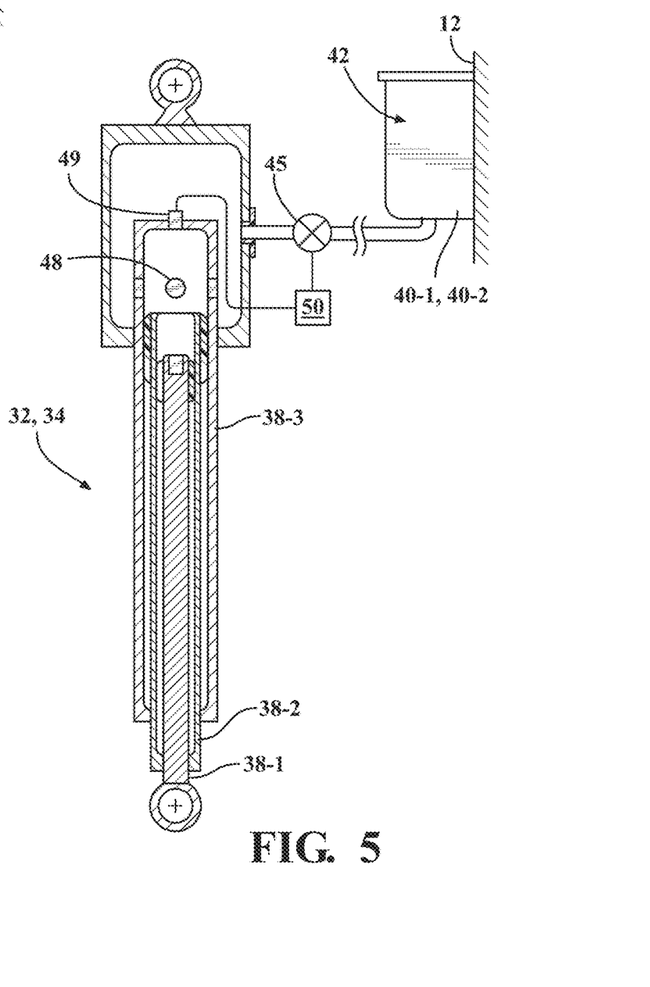
FIG. 5 is a schematic close-up cross-sectional side view of the telescoping multiple-section link shown in FIG. 4, the subject link being illustrated in a fully contracted state, according to the disclosure.

As shown in FIGS. 2 and 3, the respective first and second reservoirs 40-1, 40-2 may be mounted to (or incorporated into) the third section 38-3 of the corresponding first and second telescoping multiple-section links 32, 34. Alternatively, as shown in FIGS. 4 and 5, the respective first and second reservoirs 40-1, 40-2 may be arranged remotely from the corresponding first and second telescoping multiple-section links 32, 34, e.g., mounted to the vehicle body 12. Although the first and second reservoirs 40-1, 40-2 are shown mounted to the third section 38-3 in the embodiments using the MR fluid and mounted remotely in the embodiments using the hydraulic fluid, either embodiment may employ a remote or a third section 38-3 mounted reservoir. The remotely mounted first and second reservoirs 40-1, 40-2 may be fluidly connected to the corresponding links via appropriate high-pressure tubing or lines. As shown in FIGS. 2-5, each of the first and the second telescoping multiple-section links 32, 34 may include a sensor 49 configured to detect the length L of corresponding first or second telescoping multiple-section link 32, 34. The sensors 49 may, for example, be hall effect or magnetic type and be mounted to the third section 38-3. Each sensor 49 may be arranged internally to the respective first or second telescoping multiple-section link 32, 34, facing the corresponding first section 38-1 (as shown in FIGS. 2-5).

The vehicle 10 may further include an electronic controller 50 (shown in FIGS. 1-5) configured to regulate operation of the respective first and second telescoping multiple-section link 32, 34. The controller 50 may be programmed to receive signals from the sensors 49 and select between the first mode 36-1 of operation and the second mode 36-2 of operation of the first and the second telescoping multiple-section links 32, 34. The controller 50 may be a dedicated programmable electronic processor having tangible, non-transitory memory or a vehicle central processing unit (CPU) having same. As shown in FIG. 1, vehicle 10 may additionally include vehicle sensors 52, mounted on the vehicle body 12 and configured to sense or detect vehicle behavior parameters, e.g., vehicle speed, changes in orientation of the vehicle relative to the road surface 16, and/or specific g-forces acting on the vehicle.

Generally, the g-forces detected by vehicle sensors 52 may act on the vehicle 10 as a result of, and, therefore, be indicative of on-road or off-road maneuvers of the vehicle. Specific vehicle sensors 52 may include a lateral acceleration sensor configured to detect as the vehicle 10 moves laterally with respect to the road surface 16, a longitudinal acceleration sensor that is configured to detect acceleration or deceleration of the vehicle along the first axis X1, and a yaw sensor configured to detect a yaw rate of the vehicle body 12. The vehicle 10 may also include sensors 54 configured to identify the type of road surface or terrain being traversed by the vehicle, such as via GPS, radar, or optical technology.

Transition between the first and second operating modes 36-1, 36-2 of first and second telescoping multiple-section links 32, 34 may be regulated based on vehicle speed. A threshold vehicle speed 56 may be programmed into and used by the controller 50 to permit or deny the switch between the first and second operating modes 36-1, 36-2, whether locking/unlocking of the multiple-section links 32, 34 is via a controller algorithm or by the vehicle's operator. The sensors 52 and 54 are configured to communicate signals indicative of the sensed parameters to the controller 50. The controller 50 may receive signals from each sensor 52, 54 and control the first and the second telescoping multiple-section links 32, 34 based on such signals in real time, i.e., with a response time measured in milliseconds. The controller 50 may be programmed to determine changes in vehicle orientation relative to the road surface 16 as the vehicle 10 performs various maneuvers on- or off-road and in response to the received signals from the sensors 52, 54.

With continued reference to FIG. 1, the left and the right suspension corners (26-1 and 26-2 or 26-3 and 26-4) may include respective sensors 58 configured to detect displacement of the corresponding left and the right corners and communicate the data to controller 50. In turn, the controller 50 may be programmed to engage or disengage each of the first and second multiple-section links 32, 34 based on a determined difference 60 in the displacement between the corresponding left and the right suspension corners (26-1 and 26-2 or 26-3 and 26-4) relative to a predetermined threshold value 62. The threshold value 62 may be predetermined empirically for each individual vehicle application and programmed into the controller 50.

The controller 50 may also be programmed to regulate each of the first and the second telescoping multiple-section links 32, 34, i.e., switch between the first and second modes 36-1, 36-2 based on the determined difference 60. Specifically, the controller 50 may be programmed to disengage each of the first and second multiple-section links 32, 34 (via the second mode 36-2) when a difference 60 in displacement between the corresponding left and the right suspension corners (26-1 and 26-2 or 26-3 and 26-4) is equal to or greater than a predetermined threshold 62. The controller 50 may be similarly programmed to re-engage each of the first and second multiple-section links 32, 34 (via the second mode 36-1) when the difference 60 in displacement between the corresponding left and the right suspension corners (26-1 and 26-2 or 26-3 and 26-4) is less than the predetermined threshold 62.

The controller 50 may be additionally programmed to generate a gradual transition between the first and second modes 36-1, 36-2 of operation of the first and second multiple-section links 32, 34. The gradual switch between the first and second modes 36-1, 36-2 may facilitate a smoother response of the suspension system 24, such that vehicle balance is not upset during a vehicle maneuver by an abrupt engagement or disengagement of the subject links. For on-road operation of the vehicle 10, varying the rate of transition between first and second operating modes 36-1, 36-2 of the first and second multiple-section links 32, 34 may be used to provide adaptive vehicle roll damping.

Figure 6:
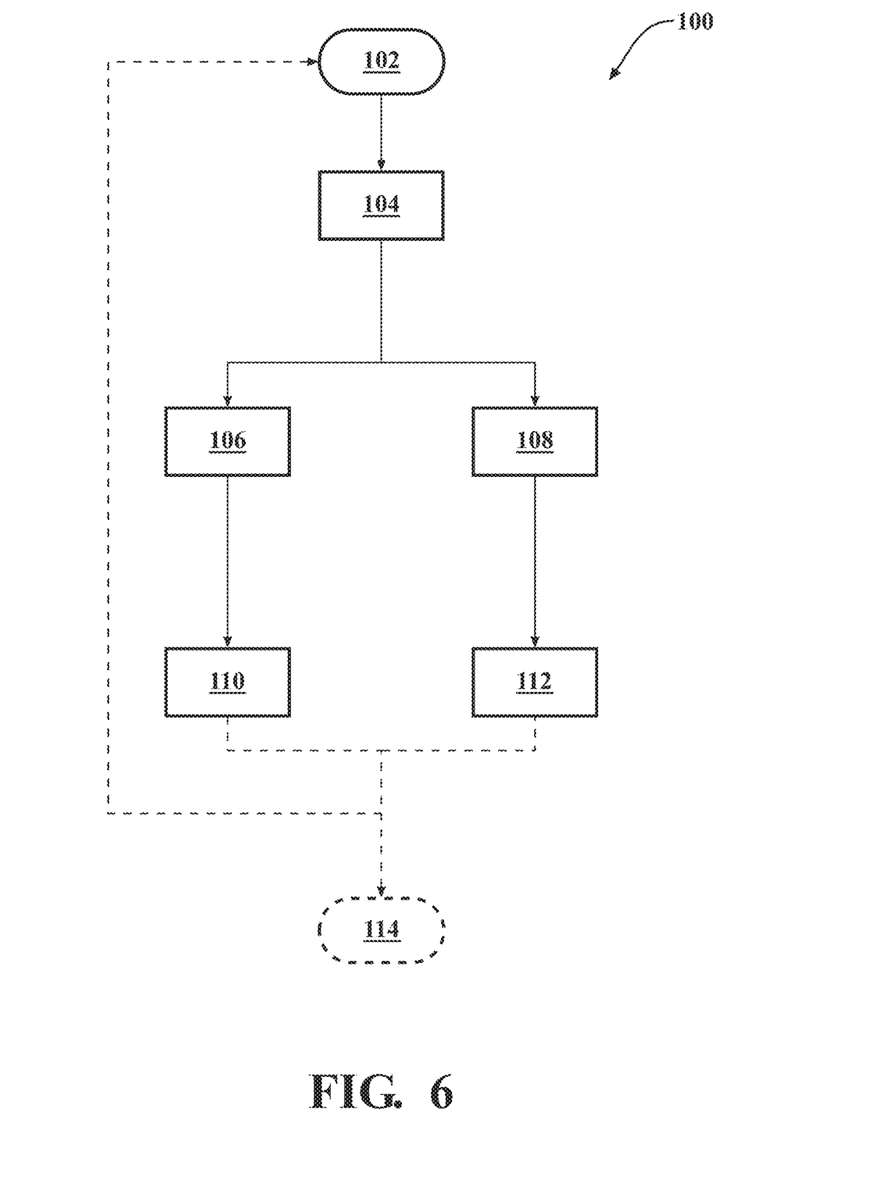
FIG. 6 illustrates a method of controlling articulation of a vehicle suspension system using the telescoping multiple-section links shown in FIGS. 1-5.

A method 100 of controlling articulation of a vehicle suspension system 24 using the first and second multiple-section links 32, 34 is shown in FIG. 6 and described below with reference to the structure shown in FIGS. 1-5. Method 100 commences in frame 102 with monitoring, via the electronic controller 50, displacement of each of the right-front suspension corner 26-1 and left-front suspension corner 26-2 for the vehicle 10 including a front stabilizer bar 30, and also the right-rear suspension corner 26-3 and left-rear suspension corner 26-4 if the vehicle 10 includes another stabilizer bar 30 at the rear axle. Following frame 102, the method advances to frame 104. In frame 104, the method includes determining the difference 60 in displacement between the right-front and left-front suspension corners 26-1, 26-2, and between the right-rear and left-rear suspension corners 26-3, 26-4. From frame 104, the method moves on to frame 106 or to frame 108.

In frame 106, the method includes detecting, via the electronic controller 50, a request for off-road operation of the vehicle 10, e.g., by the vehicle operator via requesting the second mode 36-2 of operation of the first and second multiple-section links 32, 34. After frame 106, the method proceeds to frame 110. In frame 110 (following the request to operate the vehicle 10 off-road is detected), if the first mode 36-1 is presently engaged, for example, because the vehicle 10 was proceeding down a paved road, the ECU 50 may trigger switching the respective multiple-section links into the second mode 36-2. Specifically, the method includes disengaging, via the electronic controller 50, each of the first and second multiple-section links (by placing the respective multiple-section links into the second mode 36-2) when the difference 60 in displacement between the corresponding left and the right suspension corners (26-1 and 26-2 or 26-3 and 26-4) is equal to or greater than a predetermined threshold 62.

In frame 108, the method includes detecting, via the electronic controller 50, a request for on-road operation of the vehicle 10, e.g., by the vehicle operator via requesting the second mode 36-1 of operation of the first and second multiple-section links 32, 34. After frame 108, the method proceeds to frame 112. In frame 112 (following the request to operate the vehicle 10 on-road is detected), if the second mode 36-2 is presently engaged, for example, because the vehicle 10 was traversing a rough terrain, the ECU 50 may trigger switching the respective multiple-section links into the first mode 36-1. Specifically, the method includes re-engaging, via the electronic controller 50, each of the first and second multiple-section links (by placing the respective multiple-section links into the first mode 36-1) when the difference 60 in displacement between the corresponding left and the right suspension corners (26-1 and 26-2 or 26-3 and 26-4) is less than the predetermined threshold 62.

Following either frame 110 or frame 112, the method may loop back to frame 102 for further monitoring of the displacement of the front suspension corners 26-1, 26-2 and rear suspension corners 26-3, 26-4. Otherwise, if the vehicle 10 has come to a stop and either the powerplant 14 has been shut off, or the drivetrain has been placed in park, the method may conclude frame 114 with the first and second multiple-section links 32, 34 remaining either in the first mode 36-1 or in the second mode 36-2. Overall, method 100 is intended to provide a vehicle equipped with the described multiple-section links 32, 34 with the capability to maintain the vehicle's road wheels in contact with the road surface while negotiating off-road terrain and maintain desired roll-stiffness while maneuvering along a paved road.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework and the scope of the appended claims.

What is claimed is:

1. A vehicle comprising:
a vehicle body arranged along a first axis;
a first road wheel and a second road wheel, each mounted on a second axis perpendicular to the first axis and configured to maintain contact with a road surface;
a stabilizer bar mounted to the vehicle body configured to generate a predetermined vehicle roll-stiffness;
a first telescoping multiple-section link connecting the stabilizer bar to the first road wheel; and
a second telescoping multiple-section link connecting the stabilizer bar to the second road wheel, wherein:
each of the first and the second telescoping multiple-section links is configured to selectively operate in a first mode and a second mode;
in the first mode, telescoping of each of the first and the second multiple-section links is locked to operatively connect the first road wheel to the second road wheel via the stabilizer bar; and
in the second mode, the telescoping of each of the first and the second multiple-section links is unlocked to operatively disconnect the first road wheel and the second road wheel from the stabilizer bar; and
wherein each of the first and the second telescoping multiple-section links includes:
a first, a second, and a third section, wherein the first section is configured to selectively extend into and retract from the second section and the second section is configured to selectively extend into and retract from the third section; and
a sensor arranged internally to the respective telescoping multiple-section link, facing the corresponding first section, and configured to detect a length of the corresponding link.

2. The vehicle according to claim 1, further comprising a first reservoir and a second reservoir, wherein the first and second reservoirs are configured to supply a fluid to the respective first and second telescoping multiple-section links to vary the length thereof.

3. The vehicle according to claim 1, wherein each sensor is mounted to the third section of the corresponding link.

4. The vehicle according to claim 2, wherein each of the first and second reservoirs is configured to supply the fluid to the third section of the corresponding telescoping multiple-section link.

5. The vehicle according to claim 4, wherein the fluid used to vary the length of the first and second telescoping multiple-section links is a hydraulic fluid.

6. The vehicle according to claim 5, wherein each of the first and the second telescoping multiple-section links includes a servo-operated valve configured to regulate transfer of the hydraulic fluid between the respective reservoir and the corresponding third section.

7. The vehicle according to claim 4, wherein the fluid used to vary the length of the first and second telescoping multiple-section links is a magneto-rheological fluid.

8. The vehicle according to claim 7, wherein the third section includes a magnet array configured to energize the magneto-rheological fluid.

9. The vehicle according to claim 1, further comprising an electronic controller programmed to select between the first mode and the second mode of operation of the first and the second telescoping multiple-section links.

10. A system for controlling suspension articulation in a vehicle having a vehicle body arranged along a first axis, and first and second road wheels, each mounted on a second axis perpendicular to the first axis and configured to maintain contact with a road surface, the system comprising:
a stabilizer bar mounted to the vehicle body;
a first telescoping multiple-section link connecting the stabilizer bar to the first road wheel;
a second telescoping multiple-section link connecting the stabilizer bar to the second road wheel, wherein:
each of the first and the second telescoping multiple-section links is configured to selectively operate in a first mode and a second mode;
in the first mode, telescoping of each of the first and the second multiple-section links is locked to operatively connect the first road wheel to the second road wheel via the stabilizer bar; and
in the second mode, the telescoping of each of the first and the second multiple-section links is unlocked to operatively disconnect the first road wheel and the second road wheel from the stabilizer bar; and
an electronic controller programmed to select between the first mode and the second mode of operation of the first and the second telescoping multiple-section links; and
wherein each of the first and the second telescoping multiple-section links includes:
a first, a second, and a third section, wherein the first section is configured to selectively extend into and retract from the second section and the second section is configured to selectively extend into and retract from the third section; and
a sensor arranged internally to the respective telescoping multiple-section link, facing the corresponding first section, and configured to detect a length of the corresponding link.

11. The system according to claim 10, further comprising a first reservoir and a second reservoir, wherein the first and second reservoirs are configured to supply a fluid to the respective first and second telescoping multiple-section links to vary the length thereof.

12. The system according to claim 10, wherein each sensor is mounted to the third section of the corresponding link.

13. The system according to claim 11, wherein each of the first and second reservoirs is configured to supply the fluid to the third section of the corresponding telescoping multiple-section link.

14. The system according to claim 13, wherein the fluid is a hydraulic fluid.

15. The system according to claim 14, wherein each of the first and the second telescoping multiple-section links includes a servo-operated valve configured to regulate transfer of the hydraulic fluid between the respective reservoir and the corresponding third section.

16. The system according to claim 13, wherein the fluid is a magneto-rheological fluid.

17. The system according to claim 16, wherein the third section includes a magnet array configured to energize the magneto-rheological fluid.

18. A telescoping multiple-section stabilizer bar link comprising:
a first section, second section, and third section, wherein the first section is configured to selectively extend into and retract from the second section and the second section is configured to selectively extend into and retract from the third section;
a reservoir configured to supply a fluid to vary a length of the multiple-section stabilizer bar link via telescoping of the first, second, and third sections;

a sensor arranged internally to the respective telescoping multiple-section link, facing the corresponding first section, and configured to detect the length of the stabilizer bar link;

wherein:
- the telescoping multiple-section stabilizer bar link is configured to selectively operate in a first mode and a second mode;
- in the first mode, extension and retraction of the first, second, and third sections is locked; and
- in the second mode, the extension and retraction of the first, second, and third sections is unlocked.

19. The telescoping multiple-section stabilizer bar link according to claim 18, wherein the reservoir is mounted to the third section of the link.

20. The telescoping multiple-section stabilizer bar link according to claim 18, wherein the sensor is mounted to the third section of the link.

* * * * *